US008612326B1

(12) United States Patent
Smith

(10) Patent No.: US 8,612,326 B1
(45) Date of Patent: Dec. 17, 2013

(54) SYSTEM AND METHOD FOR ANALYZING RISK

(75) Inventor: Donald E. Smith, Lexington, MA (US)

(73) Assignee: Verizon Laboratories Inc., Basking Ridge, NJ (US)

( * ) Notice: Subject to any disclaimer, the term of this patent is extended or adjusted under 35 U.S.C. 154(b) by 2651 days.

(21) Appl. No.: 10/454,338

(22) Filed: Jun. 4, 2003

Related U.S. Application Data

(60) Provisional application No. 60/386,832, filed on Jun. 6, 2002.

(51) Int. Cl.
*G06Q 40/00* (2012.01)

(52) U.S. Cl.
USPC .............................. 705/36; 705/35

(58) Field of Classification Search
USPC ..................................... 705/36, 35
See application file for complete search history.

(56) References Cited

U.S. PATENT DOCUMENTS

2003/0018556 A1* 1/2003 Squyres ........................ 705/36
2003/0225660 A1* 12/2003 Noser et al. .................... 705/36

OTHER PUBLICATIONS

Padmanabhan, Ganesh; "Network element management gets classy"; Telecommunications Americas; Jun. 2001.*
Evaristo, J Roberto; Munkvold, Bjorn Erik; "Collaborative infrastructure formation in virtual projects"; Journal of Global Information Technology Management; 2002.*
David E. Bell, "Risk, Return, and Utility", Management Science, Jan. 1, 1995, pp. 23-30, vol. 41, No. 1.
Robert B. Cooper, "Introduction to Queueing Theory", 2nd Edition, 1981, pp. 30,80, North-Holland, NY.
Haim Levy, "Stochastiac Dominance and Expected Utility: Survey and Analysis", Management Science, Apr. 1992, pp. 555-593, vol. 38, No. 4.
R. Duncan Luce and Howard Raiffa, "Games and Decisions", pp. 12-38, John Wiley & Sons, Inc., NY.
Wlodzimierz Ogryczak, Andrzej Ruszczynski, "From stochastic dominance to mean-risk models: Semideviations as Risk Measures", European Journal of Operational Research, 1999, pp. 33-50,116(1).
H.L. Royden, "Real Analysis", 2nd edition, The Macmillan Company, London, 1968, p. 108.

* cited by examiner

*Primary Examiner* — Edward Chang

(57) ABSTRACT

The present invention provides a method and system for analyzing risk. An embodiment of this invention comprises determining a deployment cost and an outage cost for each of a plurality of portfolios. The portfolio comprises one or more elements with a predetermined capacity. Total cost, which is an indicator of deployment cost and risk, for each portfolio is then determined by summing the deployment cost and the outage cost. The total cost of at least two portfolios is compared.

36 Claims, 13 Drawing Sheets

SYSTEM AND METHOD FOR ANALYZING RISK

CROSS REFERENCE TO RELATED APPLICATIONS

This application claims priority under 35 U.S.C. §119(e) to U.S. Provisional Application No. 60/386,832, titled "Probabilistic Model To Analyze Risks Associated With Telecommunication Network Size," filed Jun. 6, 2002, the entirety of which is hereby incorporated by reference.

BACKGROUND OF THE INVENTION

1. Field of the Invention

This invention generally relates to risk analysis. More specifically, this invention relates to a system and method for analyzing the risks associated with implementing telecommunication networks of varying network element sizes.

2. Related Art

A common issue facing large telecommunications carriers involves determining the optimum size for telecommunications network elements. Due to economies of scale and the development of new technologies, many carriers utilize infrastructure components of ever increasing size. This results in concentrating larger amounts of customer traffic onto fewer resources. For examples, telecommunication carriers utilize larger circuit switches and cross-connects and fibers with greater capacity. However, the concentration of larger amounts of traffic on fewer resources means that the failure of such a resource can have a large—even catastrophic—impact.

Thus, a problem facing telecommunications carriers is determining the size at which the risks associated with larger network elements overtake the cost savings provided by larger network elements. A need exists for a model that analyzes this issue.

SUMMARY OF THE INVENTION

An embodiment of the present invention provides a model for analyzing network elements, preferably of a single type (e.g., a digital cross-connect). A purpose of this model is to compare scenarios that differ only in the size of the network elements, in order to provide an analytical framework for determining an optimum size for the network elements that make up a network.

In one embodiment, the present invention provides a method for analyzing risk. This method comprises determining a deployment cost and an outage cost for each of a plurality of portfolios. The portfolio comprises one or more elements with a predetermined capacity. Total cost, which is an indicator of deployment cost and risk, for each portfolio is then determined by summing the deployment cost and the outage cost. The total cost of at least two portfolios is compared. Deployment costs may be determined responsive to the cost of obtaining each element and recurring costs associated with maintaining each element. Outage costs are determined responsive to the probability of an element outage and the direct and indirect costs of that outage.

In additional embodiments, each element within a particular portfolio has identical capacity.

In another embodiment, the present invention again provides a method for analyzing risk. Once again, this method comprises determining a deployment cost and an outage cost for each of a plurality of portfolios. The portfolio comprises one or more elements with a predetermined capacity. Total cost for each portfolio is then determined by summing the deployment cost and the outage cost. Moreover, a total cost variability is determined for each portfolio. Expected utility is determined responsive to total cost and total cost variability. In some embodiments, the portfolio with the highest expected utility may be selected as the optimum portfolio.

In another embodiment, a computer program product is provided comprising a computer usable medium having computer program logic recorded thereon for instructing a computer system to determine deployment and outage costs, total cost and total cost variability, expected utility and to compare expected utility between at least two portfolios.

DETAILED DESCRIPTION OF THE PREFERRED EMBODIMENTS

Reference now will be made to the present preferred embodiments of the invention, examples of which are illustrated in the accompanying drawings.

In one embodiment, the present invention provides a model for analyzing network elements, preferably of a single type (e.g., a digital cross-connect). A purpose of this model is to compare scenarios that differ only in the size of the network elements, in order to provide an analytical framework for determining an optimum size for the network elements that make up a network. Although the present invention has been described herein with reference to analyzing network elements, it should be understood that this is by way of example only, and the present invention may be applied in other embodiments not specifically described herein.

Figure 1:
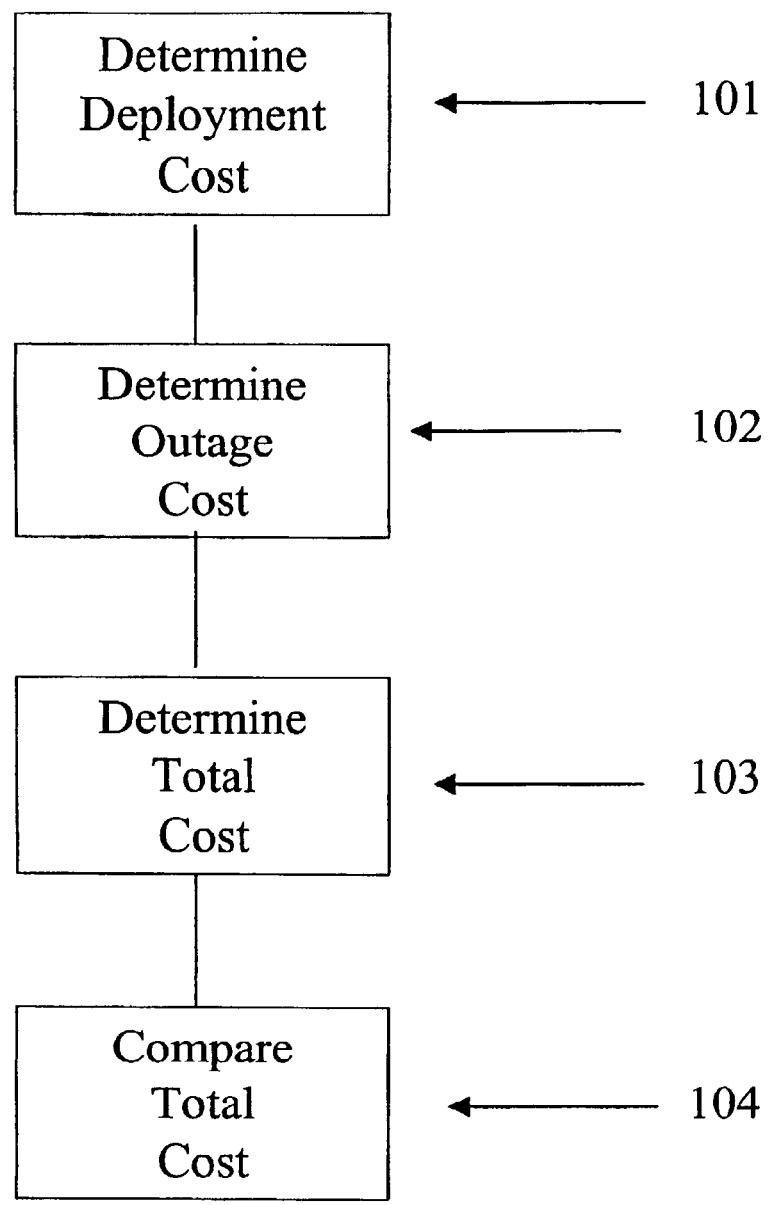
FIG. 1 depicts a method according to an embodiment of the present invention for analyzing risk.

A preferred embodiment of the present invention is shown in FIG. 1. In the first step of the method shown in FIG. 1, step 101, the deployment cost for several portfolios is determined. As used herein, a portfolio is a collection of elements that serve some purpose. For example, a portfolio can be a collection of network elements that serve total customer demands that are the same for all portfolios. Portfolios differ in the size and number of the network elements they contain. Since demand is independent of portfolio, a portfolio of larger elements has fewer elements. Both the demand on all portfolios and the number of elements in each portfolio can change over time. In a preferred embodiment, each network element within a portfolio is of equal size or capacity.

The deployment cost, which is determined in step 101, may include both capital cost associated with the installation of equipment and the ongoing operating costs. In general, given a demand forecast, the deployment costs are fairly straightforward and predictable. In a preferred embodiment, deployment cost is the present value of all such costs that occur in a specified time interval. In general, deployment costs benefit from economies of scale. Thus, a portfolio's deployment cost per circuit (and also its overall deployment cost because demand in circuits is the same for all portfolios) may decrease as the network element size increases.

In the next step, step 102, the outage cost of the portfolio is determined. Since outages are random in both occurrence and impact, the outage cost is preferably a random variable, which is expressed in a unit of measure comparable to deployment cost. For example, outage (and deployment) cost may be expressed in dollars. The portfolio outage cost distribution may have a longer tail as the network element size grows because larger outages generally have proportionally larger costs.

In the third step in the method shown in FIG. 1, step 103, a portfolio's total cost is determined. Total cost is determined by summing deployment cost and outage cost over a specified time interval, such as a life cycle.

Because in general a portfolio's deployment cost decreases with element size but its outage cost increases, the behavior of the average total cost with respect to element size is unpredictable. Thus, in step 104, the total cost of at least two portfolios is compared in order to determine which of the two portfolios has the lower total cost.

It is possible that there is a threshold beyond which the element is "too big." In other words, beyond a certain size, some statistic of the total portfolio cost becomes unacceptably large. For example, the mean or the probability of a catastrophic outage might become too large.

In a preferred embodiment, the present invention will provide a model for reconciling the savings due to economies of scale against the risks in the tails of the outage cost distribution by using stochastic dominance and utility functions.

The following discusses the determination of deployment cost in more detail. In particular, the deployment cost associated with a network of broadband digital cross-connects (DCS) is discussed. However, this is for illustration purposes only and the present invention is not limited to this context.

A broadband DCS is a sorting machine that resides in a central office (CO). It unpacks and repacks high-speed transport facilities (OC3, OC12, OC48, etc.) in units of DS3's. That is, the DCS can demultiplex DS3's out of its high-speed incoming interfaces and recombine the DS3's to feed outgoing high-speed interfaces. Circuits terminate on ports; the cross-connect's switching matrix accomplishes the sorting and bundling of DS3's onto outgoing interfaces. Vendors usually express the size of the matrix in terms of DS3-equivalent ports. Since each circuit uses two ports per machine, a DCS with a 6000 DS3-equivalent port matrix can carry 3000 DS3-equivalent circuits.

Broadly speaking, a DCS consists of "common" equipment, that all circuits share, and ports, that serve one circuit each. Examples of common equipment are the control and administrative complex in a DCS and the matrix. The presence of fixed costs means that if the capacity of the common equipment is doubled, its cost increases by less than a factor of two. Symbolically, if e denotes the common equipment cost as a function of its capacity c in circuits and r is a positive integer, then $e(rc) \leq re(c)$.

The last inequality suggests that r machines of circuit capacity c and one machine of circuit capacity rc can serve the same demands. In fact, the circuit capacity of one large machine may be larger than that of the r smaller machines because connections between machines use up capacity. When no port to a destination is available to an incoming circuit on the DCS, but such a port is available on another DCS in the CO, the circuit must go from the first DCS to the second and then to its destination. The connections between DCS's, called tie pairs, typically use about 10% of the ports on each DCS. A circuit that traverses only one DCS uses two ports in the CO; a circuit that traverses a tie pair uses a total of four ports. Because of this, r DCS's, each of circuit capacity c, can handle fewer than rc circuits. A portfolio of fewer, larger DCS's reduces tie pair waste, thereby saving cost.

Bigger network elements also reduce ongoing expenses. Network elements require software upgrades at least annually. A portfolio with fewer machines requires fewer software upgrades. Assuming that the price per machine for software is independent of machine size, the total annual software cost is proportional to the number of machines in the portfolio.

Moreover, as the circuit demand grows, the carrier must add DCS's more frequently the smaller the machines are. Each addition entails planning activities, as well as testing and turn-up. However, the associated expenses are small compared to the costs of the activities discussed so far and, in a preferred embodiment, may be neglected.

In addition, it may be expected that provisioning, monitoring and maintenance is more costly with a larger number of smaller machines, especially with tie pairs deployed. However, the advantages of the larger-machine portfolio in this area may be negligible in the future thanks to "flow-through" processes. Flow-through involves automated systems that can provision or maintain a circuit's path at a cost that is nearly independent of the number of machines a circuit traverses. Accordingly, these costs may be neglected in preferred embodiments.

Finally, larger-machine portfolios consume less power than their smaller-machine counterparts because certain fixed costs get spread over a larger number of circuits. However, the difference in power costs is small between portfolios and power consumption differences may be neglected from preferred embodiments.

Additional deployment cost variations responsive to element size may be apparent to one skilled in the art, and may be considered in a deployment cost analysis.

Conceptually, the deployment cost model is simple: deployment costs are summed as they occur. A given demand profile drives the growth in equipment. The model preferably computes the number of DCS's of a chosen matrix size required to carry the circuit demand (taking into account capacity expansion rules, tie pair waste, etc.). At each growth spurt, a preferred embodiment computes one or more of the following:

- Either the entire cost of a new DCS or the cost of a matrix upgrade.
- Port costs, including both wiring (of the shelf in which line cards reside) and equipping (line card) costs. The number of ports added covers the additional circuit demand, including tie pair waste and reserve port capacity.
- A software upgrade cost.

Figure 2:
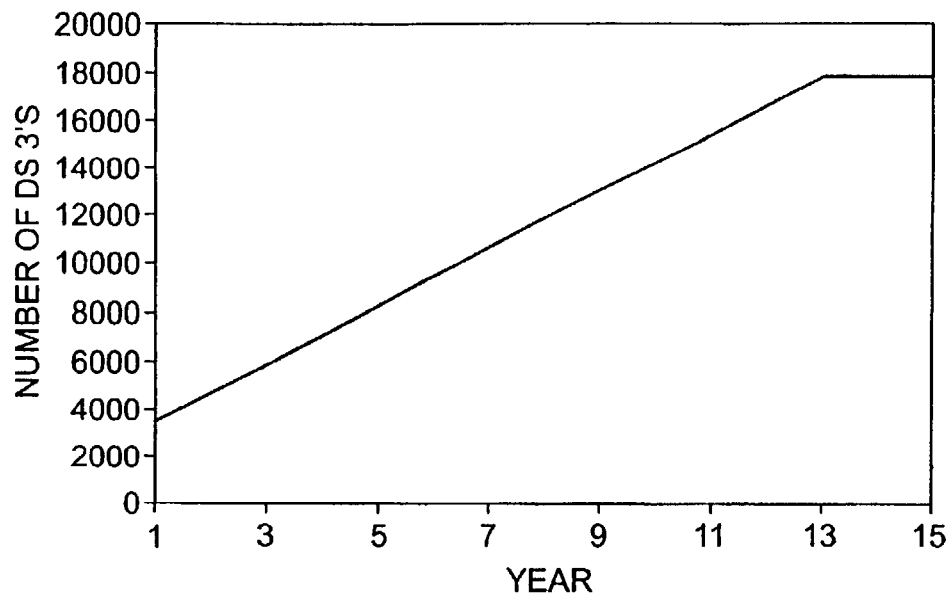
FIG. 2 depicts an example demand profile for a central office (CO).

A preferred model for analyzing deployment costs may be illustrated with the examples shown in FIGS. 2-11. FIG. 2 shows a demand profile for a CO that grows linearly over time. The example compares four portfolios that carry the demand shown. Each portfolio consists of DCS's of one of four matrix sizes, 6000, 12000, 24000, or 36000 DS3-equivalent ports (these correspond approximately to certain sizes that are presently used in the industry).

Figure 3:
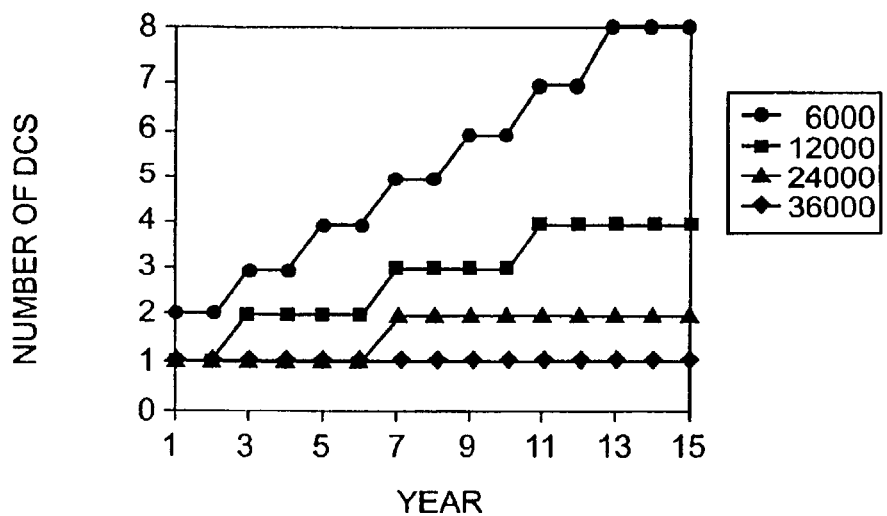
FIG. 3 depicts an example representation of the number of digital cross connects (DCS) for a number of portfolios.

FIG. 3 shows how many DCS's are in each portfolio in each year. In year 1, the portfolios come into existence: before year 1, it can assumed that a single 6000-port DCS served the office. In year 1, we must either add another 6000-port machine or upgrade the matrix to one of the other sizes considered. Thus, in year 1 the graph shows two 6000-port DCS or one DCS of any of the other three matrix sizes. At the two portfolio extremes, it is possible to serve the maximum demand with either one DCS of the largest size or with eight DCS's of the smallest size.

The curve in FIG. 2 levels off because it shows the demand that the different portfolios carry (not the offered load). Additional machines would be necessary to carry excess demand. The DCS's in the four example portfolios reach capacity, thereby illustrating two different phenomena before and after the portfolios reach capacity. During the circuit growth phase, the matrices are often not full, making outage costs smaller than when the DCS reaches capacity. The deployment cost savings (of a portfolio of large machines relative to a portfolio of small machines) occur during this phase. After the machines fill, the annual deployment cost savings become small (software only), but the outage impact is greatest. The outage costs become large only after the deployment cost savings occur. However, the discounting in present value calculations diminishes the effect of outage costs.

In a preferred embodiment, an expression for the cumulative, discounted deployment cost is necessary. Denote by m a matrix size (which indexes portfolios; we shall henceforth speak of "portfolio m"), r a discount rate or cost of capital (for calculating present values), and t time. Given a portfolio with fixed matrix size m, let $\{s_n: n=1, 2, \ldots\}$ be the sequence of times at which deployment costs occur, with $s_i$ the time in year 1 when a 6000-port machine is added or its matrix is upgraded. Let $m_t = \#\{n: s_n \le t\}$ be the number of deployment cost events up to time t and let $q_n$ be the cost of the nth event. Then the cumulative, discounted (to time 1) total deployment cost up to time t is given by $$c_d(m, r, t) = \sum_{n=1}^{m_t} q_n (1+r)_n^{-s+1}. \quad (1)$$

Because $q_n$ or $s_n$ are more explicitly presented, the right hand side of (1) is not encumbered with indices showing the matrix size m. Equation (1)'s purpose is to illustrate how to calculate cumulative, discounted deployment costs. In practice, time is preferably discrete (in years): then $s_n = n$ (i.e., accumulate all events over a whole year), $m_t = t$, and $q_n$ is the total cost incurred in year n.

Note that, given the demand profile, the sequence $\{s_n: n=1, 2, \ldots\}$ is a deterministic process, not a stochastic one. Similarly, the costs $q_n$ are not random.

Figure 4:
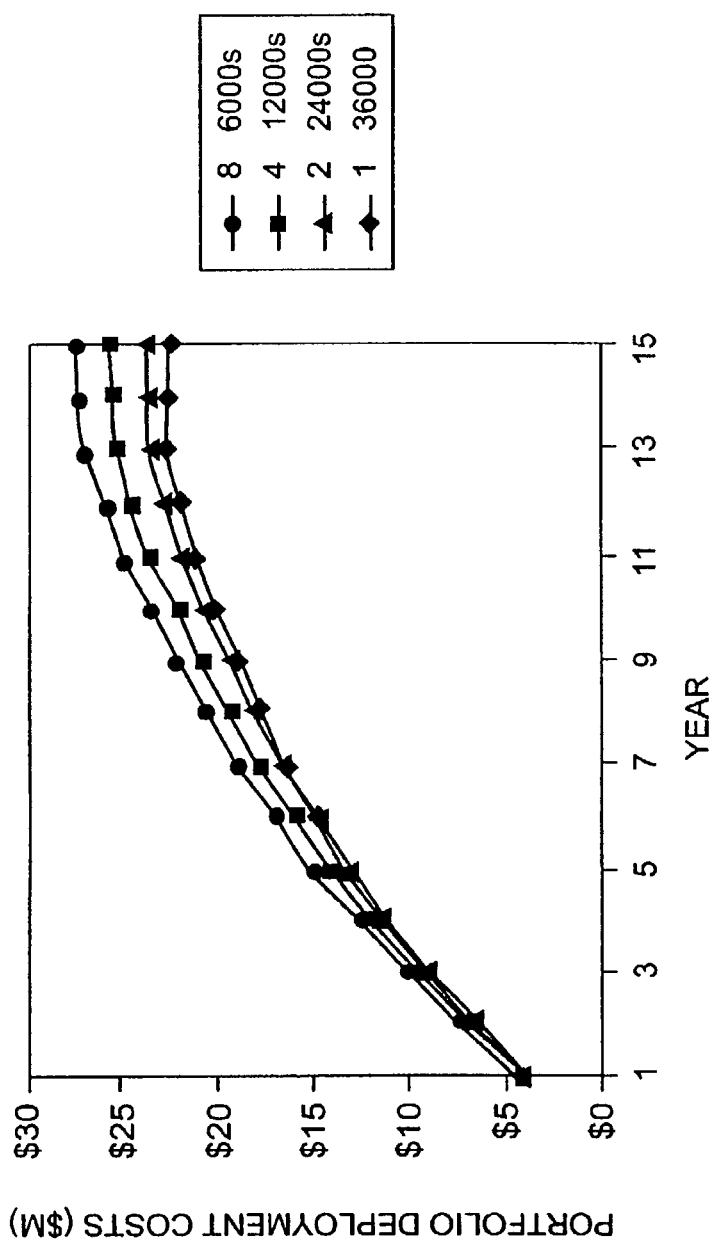
FIG. 4 depicts an example deployment cost graph.

FIG. 4 illustrates the deployment cost (1) in the present example as a function of both m and t with r fixed. The x-axis displays the time t and the different curves correspond to the four values of matrix size m in the example. The economies of scale manifest themselves in the decreasing values of deployment cost as the matrix size in the portfolios increases. Symbolically, if m<m', then $c_d(m,r,t) \ge c_d(m',r,t)$. For example, the four values in year 15 are the present values of the total lifecycle cost of the four portfolios. Portfolio 36000 (with one machine) is about $5M or 20% cheaper than the portfolio 6000 (with 8 machines in year 15).

Next will be described a preferred embodiment for modeling outage costs. The model for outages differs from the deployment cost model because of the random nature of outages. In a preferred embodiment, the outage cost has two important attributes: the outage cost is a random variable and it is comparable to $c_d$ because it is expressed in dollars.

A preferred embodiment of the general outage cost function may be described as follows:

Let $\{S(m, n): n=1, 2, \ldots\}$ be the sequence of times at which outages occur in portfolio m, aggregated over all DCS's in the portfolio. The process $\{S(m, n)\}$ is a stochastic process that we expect to be nonstationary in light of demand growth (and hence growth in the number of DCS's in the portfolio) over time.

Let $N(m, t) = \#\{n: S(m, n) \le t\}$ be the cumulative number of outages up to time t.

Let $x(m,t)$ be the number of circuits on each DCS in portfolio m at time t. For simplicity, it may be assumed that $x(m,t)$ is the same for all DCS's in the portfolio.

Let $D(m, n)$ be the duration of the nth outage in portfolio m. The duration D is a random variable.

Let $f(x, d)$ be the (dollar) cost of an outage of duration d that affects x circuits. The cost does not depend on the portfolio. The functional form of f will be described later.

The cumulative, discounted (to time 1) total outage cost up to time t is defined by $$C_o(m, r, t) = \sum_{n=1}^{N(m,t)} f(x(m, S(m, n)), D(m, n))(1+r)^{-S(m,n)+1}. \quad (2)$$

The form of (2) embodies an assumption that outage cost is additive over separate outages. This is an idealization, as a cluster of outages might have an impact larger than if the outages were dispersed over several years.

The outage cost $C_o(m, r, t)$ is a random variable because all of the upper case quantities on the right hand side of (2) are random variables. The use of uppercase letters represents random variables and the use of lower case letters represents deterministic quantities.

In a preferred embodiment, it is assumed that the failure characteristics of all DCS's are the same and do not change over time. Calculations using (2) will be in discrete time (with units a year). In discrete time, the number of DCS's in a portfolio will be constant throughout the year, as will the number of circuits on each DCS. The outage occurrence times S(m, n) are preferably rounded to the nearest year, which means that, in effect, the number of outages per year are counted. In a preferred embodiment, these additional assumptions are made:

1. Each DCS, no matter what its size, fails at most once in a year. The failures are governed by Bernoulli trials, which are independent between different years and between different DCS's. The probability of an outage is a constant p. Thus, the total number of outages in a given year is a binomially distributed random variable, equal to the number of heads in k biased coin tosses with head probability p, where k is the number of DCS's in the portfolio.

2. The outage durations D(m, n) are independent and identically distributed as both m and n vary.

3. The Bernoulli trials and the duration random variables are independent.

Assumption 1 is justified because DCS's fail very infrequently; FCC data indicates that p is roughly 0.03. If we were to assume that an individual machine fails according to a renewal process or go one step further and assume a Poisson process, the probability that the machine will fail more than once per year is negligible. The Poisson model would imply that failures in different years are independent, leading to a failure model that is essentially the Bernoulli model.

Assumption 1 also says that DCS's of different sizes fail at the same rate p. This assumption is reasonable, first because the different size DCS's are made out of the same hardware and software, so complete machine failures with machine-related causes are independent of size. Second, all failure modes are considered, including procedural errors and natural disasters. These also do not depend on the machine size.

According to Assumption 2, machine recovery times after outages probabilistically do not depend on the size of the machine. In the case of machine-related causes, the justification here is that DCS's today are highly modular and modules recover in parallel. Thus, the recovery time does not depend on size.

The discrete time model facilitates computation without real loss of generality. In discrete time, (2) becomes $$C_o(m, r, t) = \sum_{y=1}^{t} (1 + r)^{-y+1} \Gamma(m, y), \quad (3)$$

Where $$\Gamma(m, y) = \sum_{i=1}^{F(m,y)} f(x(m, y), D(m, i + N(m, y - 1))) \quad (4)$$

is the outage cost in year y. In (4), the random variable F(m, y) is the binomially distributed number of outages in portfolio m in year y. Having made the process (2) piecewise stationary (in each year) we can use Wald's identity (Cooper, R. B., 1981, Introduction to Queueing Theory, North-Holland, New York, p. 30) on (4) to calculate the mean of (3):

$$EC_o(m, r, t) = \sum_{y=1}^{t} EF(m, y) Ef(x(m, y), D)(1 + r)^{-y+1}. \quad (5)$$

Here the duration random variable has been abbreviated to the generic D, by invoking Assumption 2. E denotes the mathematical expectation.

The outage cost measures risk with the same "yardstick" (dollars) that we use to measure deployment cost. A functional form for the cost f of an outage may be determined by decomposing f into two summands, direct costs such as lost revenue $f_{LR}$ and indirect costs such as "ripple effects" cost $f_{RE}$. That is, $f_{LR} = f_{LR} + f_{RE}$.

In the example described above, lost revenue has two components, corresponding to voice and data traffic. When a DCS fails, the carrier does not collect toll revenue for the interoffice calls that cannot complete because of the outage. On top of that, FCC tariffs specify that customers with special access circuits (data "pipes" like DS1's and DS3's) can claim "credit allowances" if they lose service for more than a specified amount of time. For example, in FCC Tariff 11 the credit allowance is a full month's charges after one minute of outage time.

In addition, there are certain repercussions of an outage, especially if the outage is a serious one. When an outage occurs, wireline voice callers in the midst of calls are cut off and new callers cannot complete calls. These customers may dial again (they may find an alternate route through a working DCS) or try cell phones. Such actions may create overloads on other network elements and lead to further service disruption.

A significant outage may also damage the carrier's reputation, leading to long-term revenue loss. The carrier could face increased regulatory scrutiny. All of these repercussions may be termed "ripple effects." While they may be difficult to quantify, they may create a significant portion of the risk that large network elements present. We now discuss lost revenue and ripple effects in turn.

We will sketch the form of the summand $f_{LR}$ off corresponding to lost revenue and the assumptions used to arrive at the lost revenue function in the current example.

Broadband DCS's carry two kinds of circuits, voice trunks and special access circuits. Assume that the percentage of circuits of each kind on the DCS is known.

When a DCS fails, some or all of the trunks between central offices and tandems no longer work. If the failure of the trunks leads to lost calls, the carrier gets no revenue from those calls. The lost voice revenue may be computed as the product of three factors, the average rate at which calls are lost, the revenue per call, and the outage duration. The last of these is the second argument of f. The revenue per call may be readily estimated from typical regional long distance rates and typical holding times.

The call loss rate is somewhat more complex. As an example, suppose that the trunk group from a CO to a tandem is split equally between two DCS's and one DCS fails. From the trunk group's utilization before the outage, we can infer the call attempt rate and the percentage of calls lost after the outage (e.g., by using the Erlang B formula (Cooper, 1981)). The product of the attempt rate and the percentage of calls lost gives the call loss rate for the CO. We then sum over affected CO's, which we can do indirectly by counting DS3's that carry voice trunks.

Taking an average value for the pre-failure trunk utilization and average revenue per call figures makes the revenue lost from voice calls linear in D and x, the total number of circuits through the DCS.

Tariff FCC 11 states that if the outage duration D exceeds a threshold d (one minute), then affected special access circuit customers may demand a credit allowance. To calculate the actual allowance paid out, first sum over circuit types the number of circuits times the monthly charge for the circuit. Multiply this by the percentage of customers who demand a credit allowance and by the indicator I(D>d), which takes the value 1 if D>d and 0 otherwise. Given fixed percentages of special circuits of each type, the resulting lost revenue from special circuits is linear in x and I(D>d).

Putting the results for voice and specials together, an expression for lost revenue is $$f_{LR}(x,D) = x(vD + sI(D>d)) \quad (6)$$

Here, v and s are voice and special access circuit (constant) coefficients.

Given the subjective nature of ripple effects, a suitable way to estimate their cost may be through a series of structured interviews with executives who make significant decisions as a result of major outages. The interviewers may ask the executives to compare the severities of various outages that differ in numbers of circuits affected and in duration and to express the answers in dollar terms. Additional ways of assessing ripple effect cost are apparent to those skilled in the art. The result is an estimate for the ripple effect cost $f_{RE}(x, d)$ as a function of circuits x and duration d.

A key feature of "ripple effects" is that if one outage is twice as large as another, then the impact of the larger outage is more than twice as large as the impact of the smaller outage. We can capture this behavior by assuming that the function $g(x)=Ef(x, D)$ is convex. By an elementary fact about convex functions (Royden, H. L., 1968. Real Analysis, Macmillan, New York, p. 108) and the fact that $g(0)=0$, $g(x)/x$ is increasing in x, doubling the size x of an outage more than doubles its cost. The convexity of g also implies that (5), which equals $$EC_o(m, r, t) = \sum_{y=1}^{t} EF(m, y)g(x(m, y))(1 + r)^{-y+1} \quad (7)$$

increases with m. To see this, let n(m, y) be the number of DCS's in portfolio m in year y; F(m, y) is the number of successes in n(m, y) Bernoulli trials with success probability p. Thus, $EF(m, y)=n(m, y)p$. Write (7) as $$EC_o(m, r, t) = p\sum_{y=1}^{t} n(m, y)x(m, y)[g(x(m, y))/x(m, y)](1 + r)^{-y+1}.$$

Consider the product $k(m, y)=n(m, y)x(m, y)$ of the number of DCS in portfolio m and the number of circuits on each DCS in year y. It is tempting, but not quite true, to say that k(m, y) is the total number of circuits served in year y and therefore independent of m. The assertion is false because any circuit that traverses a tie pair gets counted twice, making k(m, y) slightly larger than the total number of circuits when the portfolio has more than one DCS. As a result, k(m, y) is slightly decreasing in m. But pretend, heuristically, that k(m, y) is independent of m.

Next, note that x(m, y) is increasing in m. Since g(x)/x is increasing in x, the term in brackets increases with m and it follows that that $EC_o(m,r,t)$ is increasing in m.

To make g convex, assume that $f_{RE}$ is separable in the sense that there are functions $f_{RE,S}$ and $f_{RE,D}$ such that $f_{RE}(x,d)=f_{RE,S}(x)f_{RE,D}(d)$. Combining this with (6) yields $g(x)=x(vED+sP(D>d))+f_{RE,S}(x)Ef_{RE,D}(D)$.

Note that duration affects average ripple costs only as a constant multiplier because outage durations have the same distribution for all portfolios. If we assume that $f_{RE,S}$ is convex, then clearly g is convex.

Figure 5:
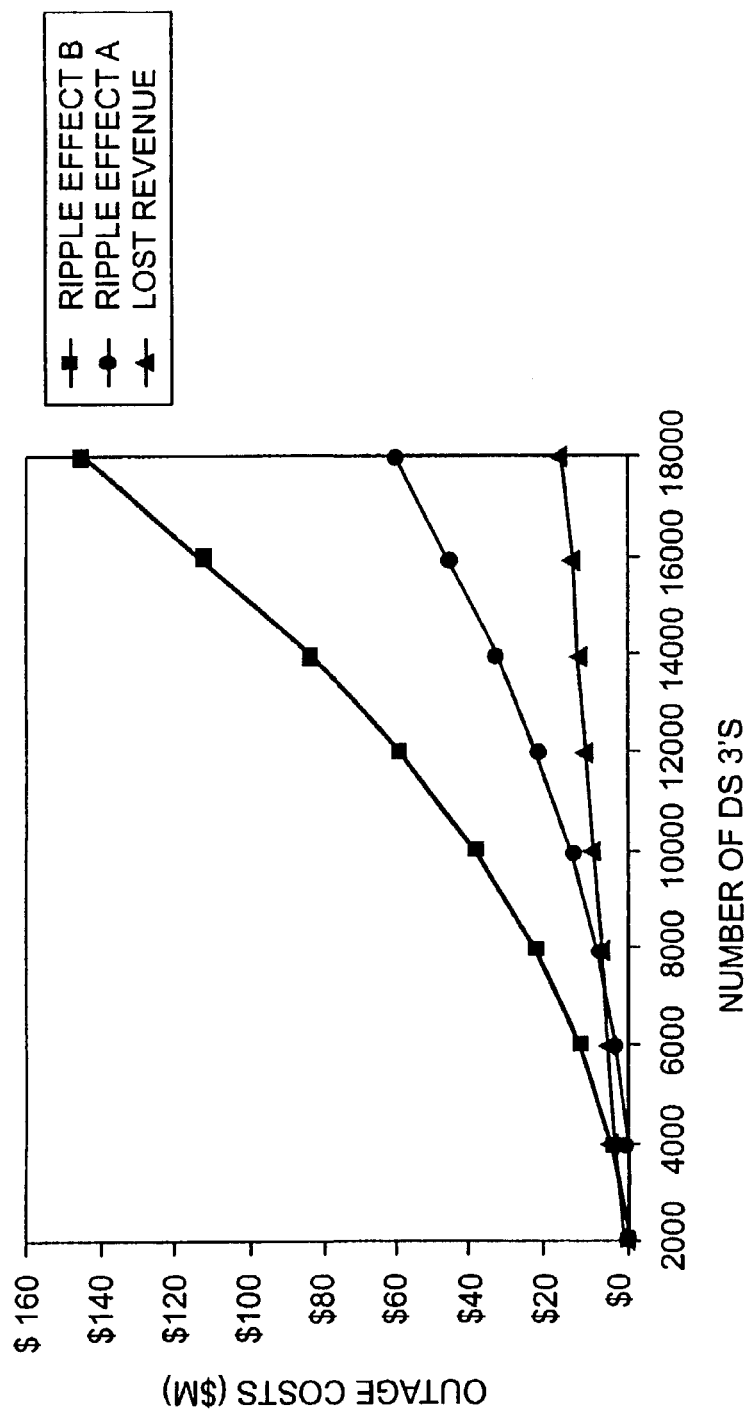
FIG. 5 depicts an example comparison of ripple effect costs.

In the discussion that follows, take $f_{RE,D}(z)=vz+sI(z>d)$, the same cost coefficient as in the lost revenue, and choose $f_{RE,S}$ to be a function that is zero for x<2000 and increases quadratically above x=2000. The intent is to have the ripple effect cost increase dramatically compared to lost revenue for large outages. FIG. 5 compares the lost revenue to two choices for $f_{RE,S}$. Ripple effect B is chosen to be larger than ripple effect A. For reference, the figure also includes lost revenue.

Figure 6:
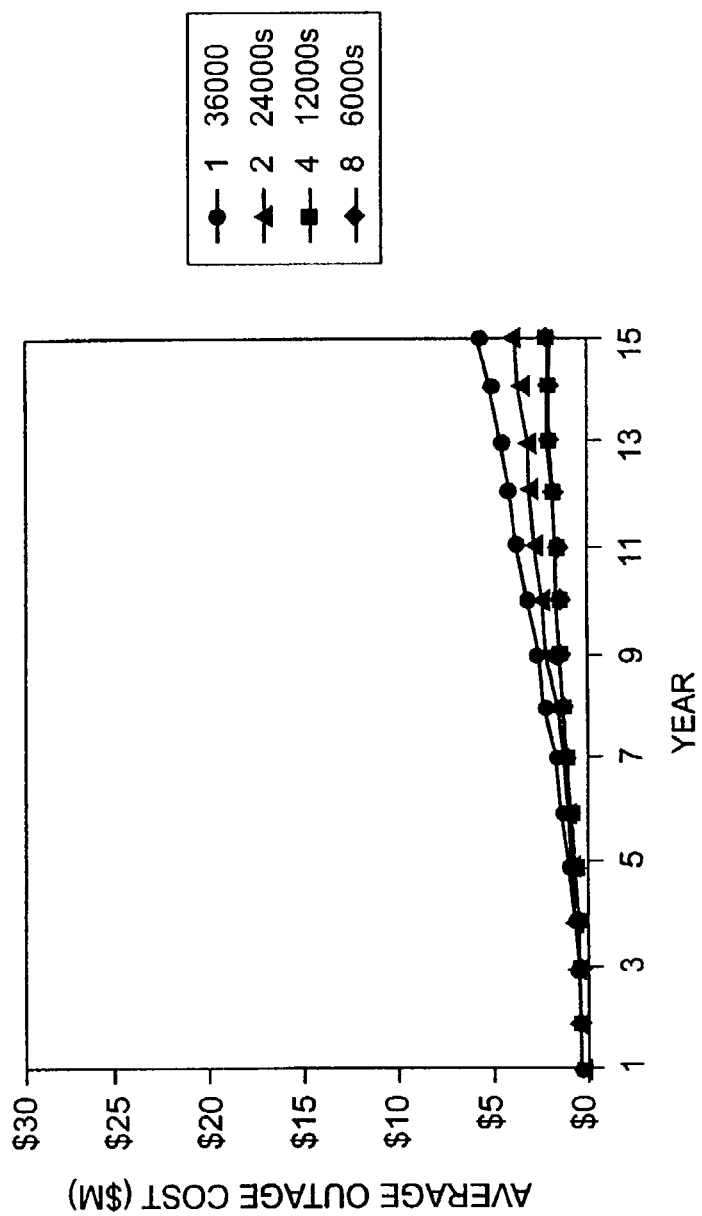
FIG. 6 depicts an example average outage cost graph.

FIG. 6 plots $EC_o(m,r,t)$ over time for the four portfolios in our running example, using ripple effect A costs. It shows that, for any given time horizon t, $EC_o(m,r,t)$ increases with m.

Total cost refers to the sum of deployment cost and outage cost (both cumulative and discounted): $C(m,r,t)=c_d(m,r,t)+C_o(m,r,t)$. The total cost is a random variable because the outage cost is random.

Average total cost is $c(m,r,t)=EC(m,r,t)=c_d(m,r,t)+EC_o(m,r,t)$. As shown in FIG. 4, $c_d(m,r,t)$ is decreasing in m and, based on (7), $EC_o(m,r,t)$ is increasing in m. The same arguments as for (7), with the expectation of (6) in place of g, would show that $EC_o(m,r,t)$ is roughly constant with respect to m when the outage cost is linear in x. In this case, c(m,r,t) would decrease with m. That is, if outage costs are linear in x, a bigger DCS is better, as measured by average total cost. With the nonlinear costs resulting from ripple effects, the behavior of c(m,r,t) as m grows is not clear.

Figure 7:
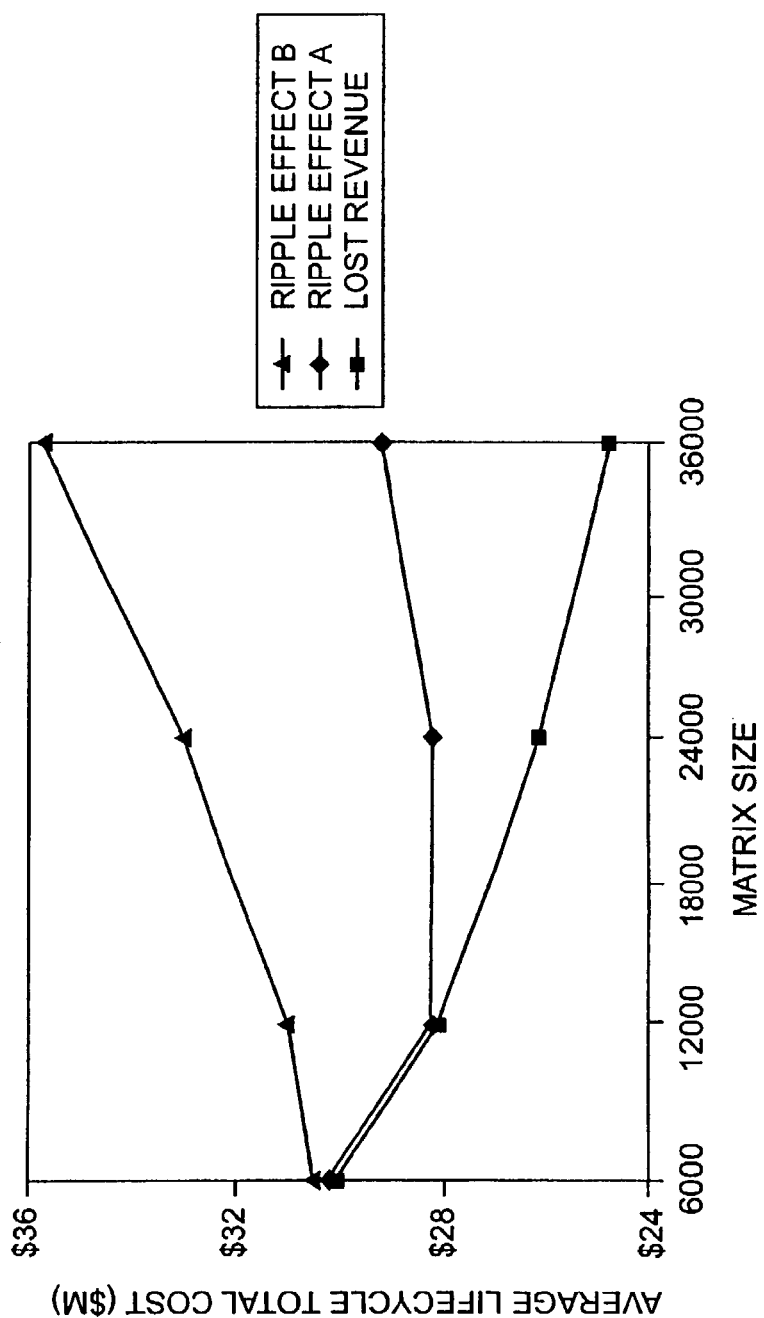
FIG. 7 depicts an example average lifecycle total cost graph.

FIG. 7 shows graphs of c(m,r,t) with respect to m when t is set to 15 years (the life cycle). The bottom curve corresponds to an outage cost consisting of lost revenue alone (zero ripple effect costs). As just discussed, the average total cost decreases as m increases, reflecting the economies of scale of large machines and the fact that average lost revenue is the same for all portfolios.

The other two curves in FIG. 7 correspond to ripple effects A and B. Average total cost B increases over the entire range of matrix sizes, while average total cost A is relatively flat, increasing a bit from portfolio 24000 to portfolio 36000. The increase comes from the stiff cost penalty that the quadratic ripple effect functions (B especially) in FIG. 5 attach to large outages.

The average total cost suggests that there is a size that is "too big." In the case of ripple effect A, the 36000-port matrix is too big because portfolio 36000's average total cost exceeds that portfolio 24000. Under ripple effect B, every matrix shown is too big and some matrix smaller than 6000 ports is optimal with respect to average total cost. However, before drawing any conclusions based on averages, it is preferable to consider the variability of total cost.

Fluctuations in the annual outage cost F(m, y) may occur for two reasons. First, outages may or may not occur. Second, when outages occur, their durations may vary. Randomness in occurrences is generally more important than randomness of duration. As m increases, we distribute the same total number of circuits over fewer DCS's. In effect, we make fewer but bigger "bets" (that the DCS will not fail) with the same total amount of "cash" (circuits). A portfolio of big DCS's will experience fewer failures per year (it has fewer DCS's to fail), but each failure will affect more circuits. On the other hand, the outage duration affects all portfolios equally.

The coefficient of variation of F(m, y) conveniently formalizes this argument, in light of the assumed separability of our cost functions. As described above, $f(x, z)=f_s(x)(vz+sI(z>d))$, where $f_s(x)=x+f_{RE,S}(x)$. Since the threshold d in FCC Tariff 11 is only one minute and all the outages in our FCC data exceed 30 minutes, we will replace I(z>d) by 1, yielding $f(x, z)=f_s(x)(vz+s)$. Substituting this into (4) and using $EF(m, y)=n(m, y)$ p, gives a mean annual outage cost of $E\Gamma(m,y)=n(m,y)pf_s(x(m,y))(vED+s)$.

For the variance of $\Gamma(m, y)$ we use Wald's identity for second moments (Cooper, 1981, p. 30) and the result Var $F(m,y)=n(m, y)p(1-p)$ to get $Var\Gamma(m,y)=n(m,y)pf_s(x(m,y))^2[v^2VarD+(1-p)(vED+s)^2]$ Then the coefficient of variation (standard deviation divided by the mean) of $\Gamma(m, y)$ is $$CV\Gamma(m, y) = \frac{1}{\sqrt{(n(m, y)p)}} \frac{\sqrt{(v^2VarD + (1-p)(vED+s)^2)}}{vED+s}$$

Given our data, the second fraction here (involving the moments of D) is about 1.15. However, since p=0.03, the first factor $1/\sqrt{(n(m, y)p)}$ ranges from 2 to 6 as n(m, y) ranges from 8 to 1. Thus, the rarity of outages is the dominant contributor to the coefficient of variation of Γ(m, y) and it makes the fluctuations in Γ(m, y) larger than the mean by a factor between 2 and 6.

The outage cost $C_o$(m,r,t) in (3) inherits the fluctuations in Γ(m, y). Although the summation and discounting in (3) smoothes out some of the fluctuations, the coefficient of variation of $C_o$(m,r,t) can still be large, even for those portfolios with the smallest m.

Our assumptions about the independence of outages in different years imply that $$\mathrm{Var}C_o(m, r, t) = \sum_{y=1}^{t} (1+r)^{-2y+2} \mathrm{Var}\Gamma(m, y)$$

Figure 8:
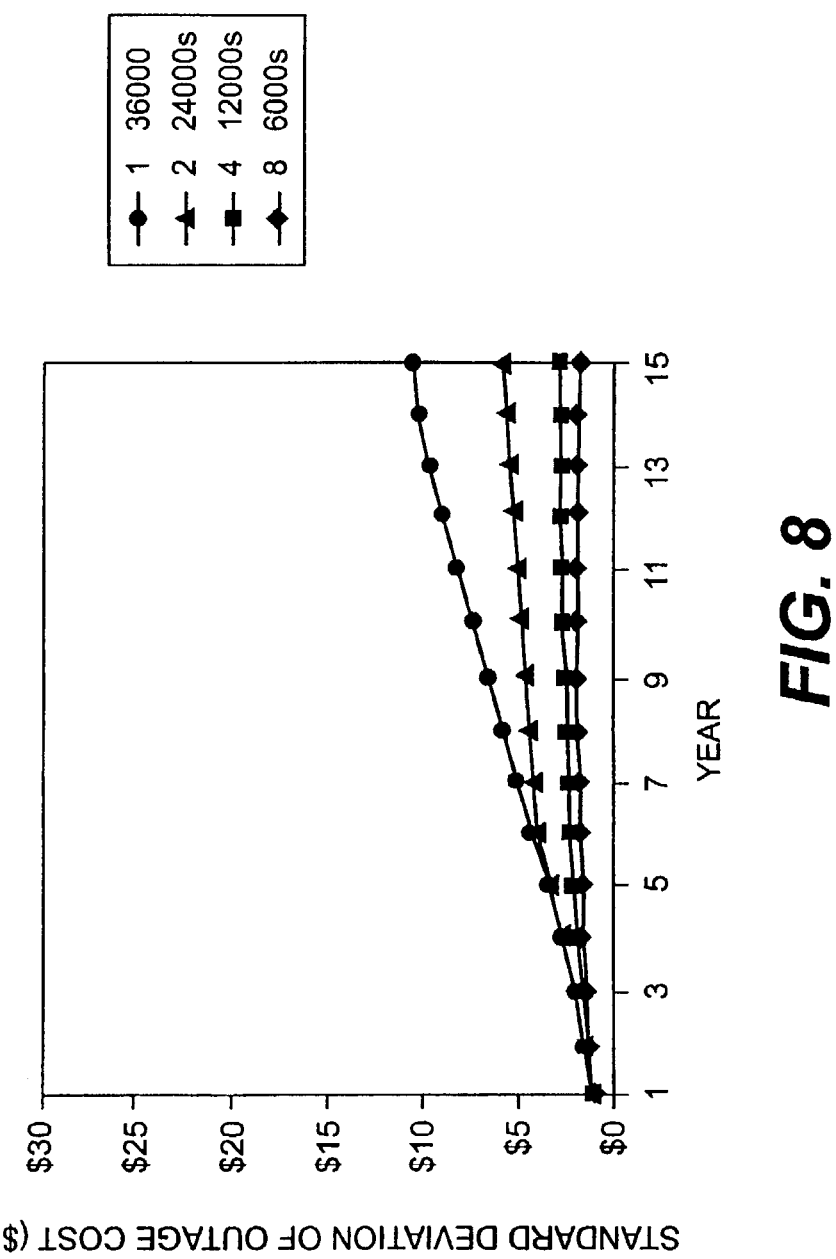
FIG. 8 depicts an example graph of outage cost standard deviation.

FIG. 8 compares the cumulative, discounted outage cost standard deviations using ripple effect costs A (compare to FIG. 6). Portfolio 6000 has a mean lifecycle outage cost of $2.4M and a standard deviation of $2.0M, yielding a coefficient of variation of 0.8. At the other extreme, portfolio 36000 has a mean of $5.9M and a standard deviation of $10.8M, yielding a coefficient of variation of 1.8.

Note that these results apply to portfolios serving one CO only. In reality, a large carrier puts broadband DOS's in many CO's. Let L be the number of locations in which the carrier will adopt a policy of deploying broadband DOS's of one of the four sizes in our running example. Assuming for the sake of illustration that the demand is the same in all L locations, the outage cost becomes the sum of L independent copies of $C_o$(m,r,t). Since the mean and variance of the outage cost are both L times that of $C_o$(m,r,t), the coefficient of variation of the resulting outage cost equals the coefficient of variation of $C_o$(m,r,t) divided by A.

Although averaging over a larger number of central offices will decrease the outage cost fluctuations relative to their means, we continue to look at a single office, realizing that risk results corresponding to a single office are higher than those for more offices.

The fluctuations of the total cost are the same as those of the outage cost because the total cost consists of the outage cost plus the non-random deployment cost. If ripple effects resemble A more than they do B, the average total cost EC(m, r,t) does not change much as m varies (FIG. 7); fluctuations in outage cost could easily make a portfolio that is cheaper on average considerably more expensive in an actual outcome. For example, using ripple effect A, the total expected cost of the portfolio 6000 is $30.1M and the standard deviation is $2.0M. By comparison, the total expected cost of portfolio 36000 is $29.3M, but its standard deviation is $10.8M. A typical fluctuation above the mean could easily push the cost of the latter well above that of the former.

Figure 9:
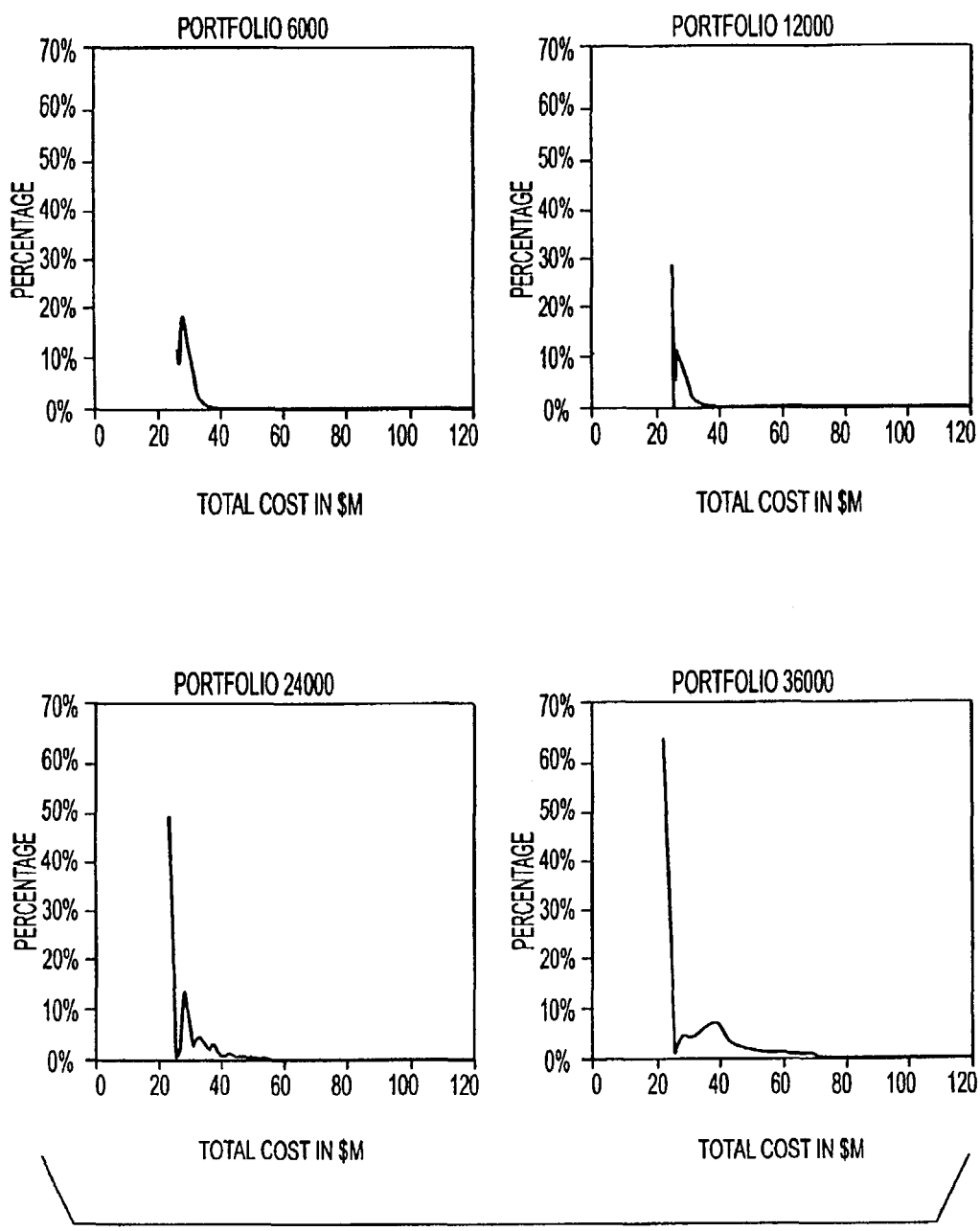
FIG. 9 depicts a series of example histograms of lifecycle costs.

FIG. 9 presents histograms of the lifecycle cost distributions of all four portfolios. Three features are apparent. First, the larger the value of m, the longer the tail of the distribution. Second, larger values of m correspond to smaller minimum costs. For example, as the matrix increases from 6000 ports to 36000 ports, the corresponding four minimum lifecycle costs are $27.6M, $25.6M, $23.8M, and $22.7M. The minimum values are the lifecycle deployment costs (i.e., total cost outcomes where the outage cost is zero). Third, the larger m is, the more likely is an outcome with minimum cost. The portfolio with larger DCS's has fewer DCS's and therefore fewer Bernoulli trials to generate outages. With fewer trials, the probability of zero outages in a lifecycle is greater. The probabilities of no outages over a lifecycle are, in order of increasing matrix size, 11%, 29%, 51%, and 63%.

These features make it hard to decide intuitively which portfolio is "best." A portfolio of larger DCS's offers a reward that is in the form of a lower minimum cost and a higher probability of attaining the minimum (and sometimes a lower mean). But the risk is that a cost far out in the tail will occur: concentration of circuits onto a small number of DCS's makes catastrophes possible.

To settle the risk-reward tradeoff, the notion of stochastic dominance may be invoked. The literature on economic applications of stochastic dominance typically concerns random variables where larger values are better, as opposed to costs, where larger is worse. To switch to the standard point of view, it is preferable to look at profits. Because all portfolios serve exactly the same traffic demands, the discounted revenues that the portfolios bring in over a lifecycle have a common (non random) value r. The revenue minus the total cost r−C(m,r,t) is the appropriate random variable.

To define stochastic dominance, denote by X and Y two different total lifecycle costs (i.e., C(m,r,t) for two different values of m). Adapting the definitions of Ogryczak, W. and Ruszczyński, A., 1999. From stochastic dominance to mean-risk models: semideviations as risk measures, European Journal of Operational Research, 116 (1), 33-50, we say that r−Y exhibits first-degree stochastic dominance (FSD) over r−X and write $r-Y \geq_{FSD} r-X$ if and only if $P(X>\xi) \geq P(Y>\xi)$ for all real $\xi$ We say that r−Y exhibits second-degree stochastic dominance (SSD) over r−X and write $r-Y \geq_{SSD} r-X$ if and only if $E(X-\xi)^+ \geq E(Y-\xi)^+$ for all real $\xi$ Here $(x)^+ = \max(x,0)$ denotes the positive part of x. Note that by setting $\xi=0$, we get $E(X) \geq E(Y)$ since costs are nonnegative.

FSD implies SSD, as can be seen by substituting a random variable for x and applying the expectation operator and Fubini's theorem to the identity $$(x-\xi)^+ = \int_\xi^\infty I(x>z)dz.$$

As a result of the first two features mentioned in connection with FIG. 9, our total lifecycle costs are not ordered by FSD. For if we take X to correspond to a larger value of m than Y, the first feature says that $P(X>\xi) \geq P(Y>\xi)$ for all sufficiently large $\xi$ while the second says that min X<min Y. But $P(X>\xi) < P(Y>\xi) = 1$ for min $X \leq \xi <$ min Y.

Calculations with the distribution functions of the four different total lifecycle costs show that the costs are ordered according to SSD. Portfolio 12000 has the lowest cost and is slightly lower than portfolio 24000. Portfolios 6000 and 36000 have the highest costs.

Stochastic dominance has well-known connection with utility functions. A utility function (Luce, R. D., Raiffa, H., 1957. Games and Decisions, John Wiley & Sons, Inc., New York) is a deterministic function u such that u(z) is the subjective value of a reward z, such as an investment return. The expected utility of a random payoff resolves the risk-reward tradeoff. For example, Eu(r−C(m,r,t)) weighs the reward of a lower average or minimum cost against the risk of large deviation above the average. Because u encodes the decision maker's perceptions of the significance of lifecycle costs, portfolio $m_1$ is better than portfolio $m_2$ if and only if its expected utility is higher: $Eu(r-C(m_1,r,t))>Eu(r-C(m_2,r,t))$.

Utility functions in economics are frequently increasing and concave. They increase because a bigger reward is better and are concave because of the decreasing marginal utility of wealth. Assuming differentiability, the two properties of the utility function u are $u'\geq 0$ and $u''\leq 0$. The connection between SSD and utility functions is that if $r-Y\geq_{SSD} r-X$, then for any u with $u'\geq 0$ and $u''\leq 0$, $Eu(r-Y)>Eu(r-X)$ (Levy, H., 1992. Stochastic dominance and expected utility: survey and analysis, Management Science, Vol. 38, No. 4, 555-593; Ogryczak, 1999).

We now illustrate the application, of utility to portfolio selection with linear transformations of utility functions of the basic form $u(z)=z-\alpha \exp(-\beta z)$ (Bell, D. E., 1995. Risk, return, and utility, Management Science, Vol. 41, No. 1, 23-30), where a and fl are positive constants. We will consider the dependence of utility on cost. Revenue does not play an explicit role.

Figure 10:
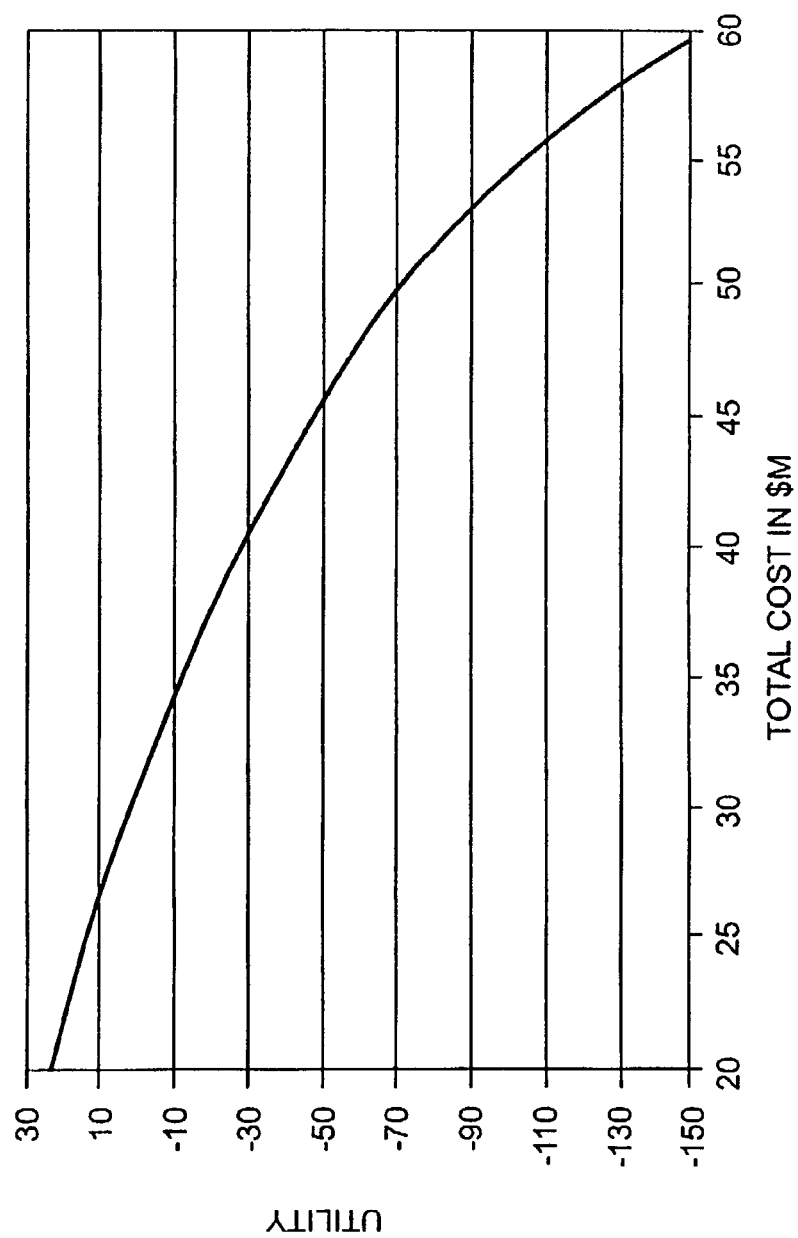
FIG. 10 depicts an example utility function.

FIG. 10 shows one example utility function (of cost). We normalize the utility to zero at the expected total cost ($30.1 M) of portfolio 6000. Costs less than $30.1M carry positive utility, while costs larger have negative utility. The utility decreases exponentially to −0.0 as the cost grows. This behavior penalizes a cost distribution with a long tail.

Figure 11:
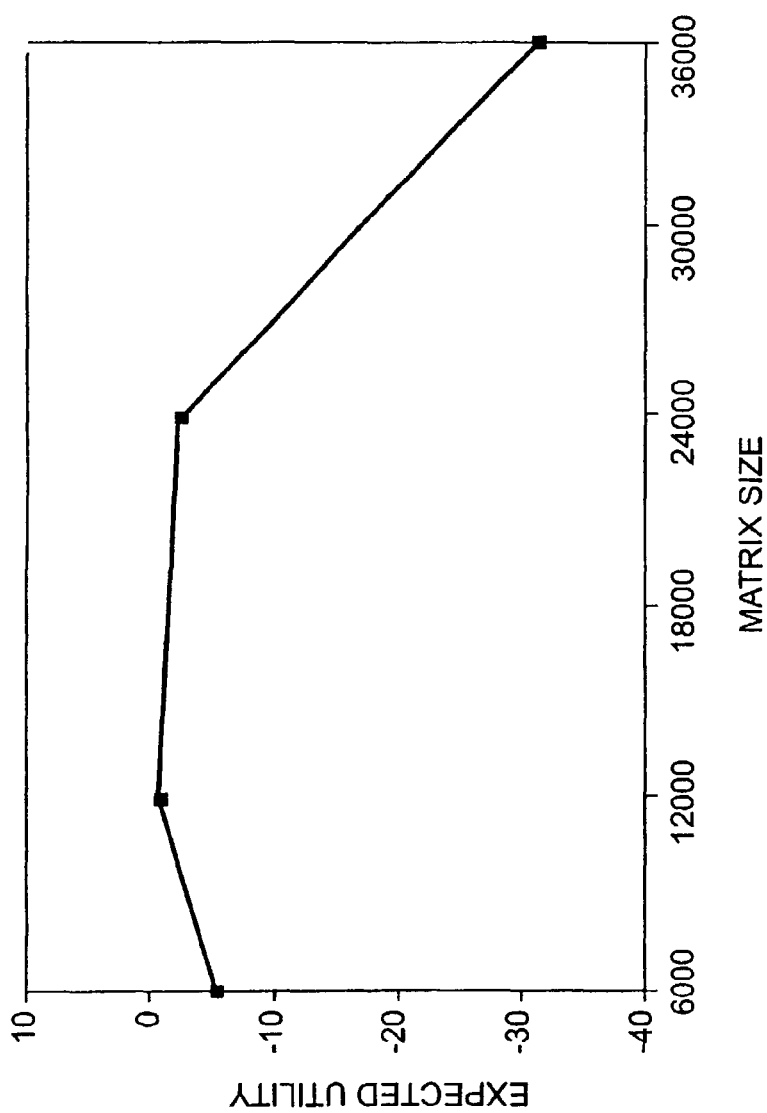
FIG. 11 depicts example expected utilities.

FIG. 11 shows the expected utilities of the four portfolios, using the utility function in FIG. 10 and total costs resulting from ripple effect A. Portfolio 6000 and portfolio 36000 have lower utility than the middle two portfolios. Portfolio 6000 has lower utility because it has the highest deployment costs. The long tails of portfolio 36000's cost distribution give it the lowest utility. Portfolio 24000 and portfolio 12000 have similar means, but portfolio 24000 has a somewhat longer tail, giving it a slightly lower utility. The utility values are ordered according to SSD.

Presented with the evidence in FIG. 11, the decision maker would conclude that the rewards of bigger DCS's (economies of scale) outweigh the outage risks if the carrier is contemplating an increase in matrix size from 6000 to 12000 ports. A further increase in matrix size to 24000 ports has little effect on the risk-reward tradeoff. However, portfolio 36000 is "too big," for the risk of a catastrophic outage now outweighs the rewards of greater size.

Note that average total cost in FIG. 7 provides the same qualitative conclusions (as noted above, the means follow the SSD ordering) but the utility function is less equivocal about portfolio 36000.

Figure 12:
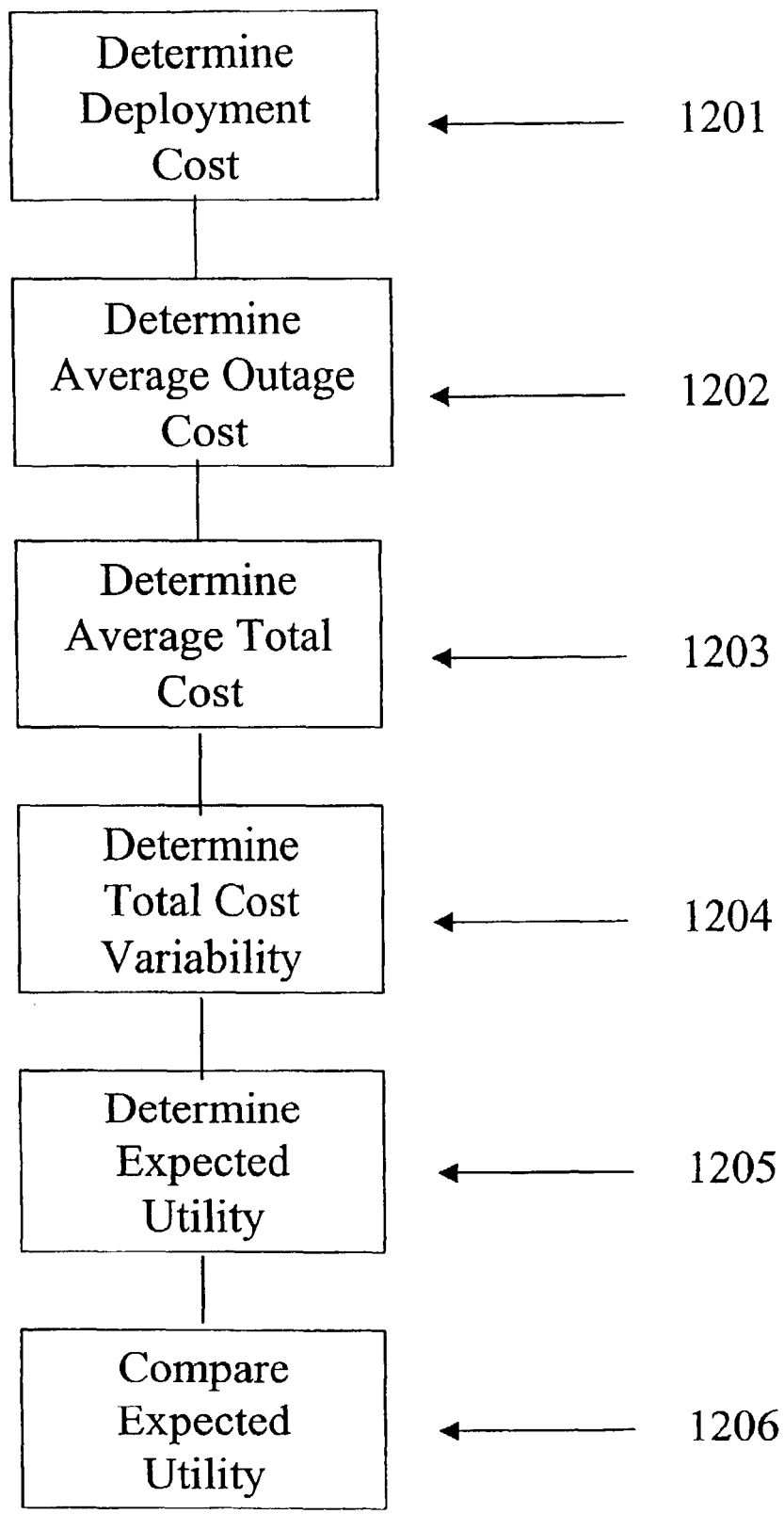
FIG. 12 depicts a method according to an embodiment of the present invention for analyzing risk.

Another preferred embodiment of the present invention is shown in FIG. 12. The first step in the embodiment shown in FIG. 12, step 1201, the deployment cost for each of a plurality of portfolios is determined. In the second step, step 1202, the average outage cost is determined. In the third step, step 1203, the average total cost is determined by summing deployment cost and average outage cost. Next, in step 1204, the total cost variability is determined. A procedure for determining the variability of total cost is described above. Next, in step 1205, the expected utility for at least two portfolios is determined. As described above, expected utility is determined responsive to total cost variability and an assumed utility function. Finally, in step 1206, the determined expected utilities of the portfolios are compared. In general, it would be advisable for a decision maker to select the portfolio with the highest expected utility.

Figure 13:
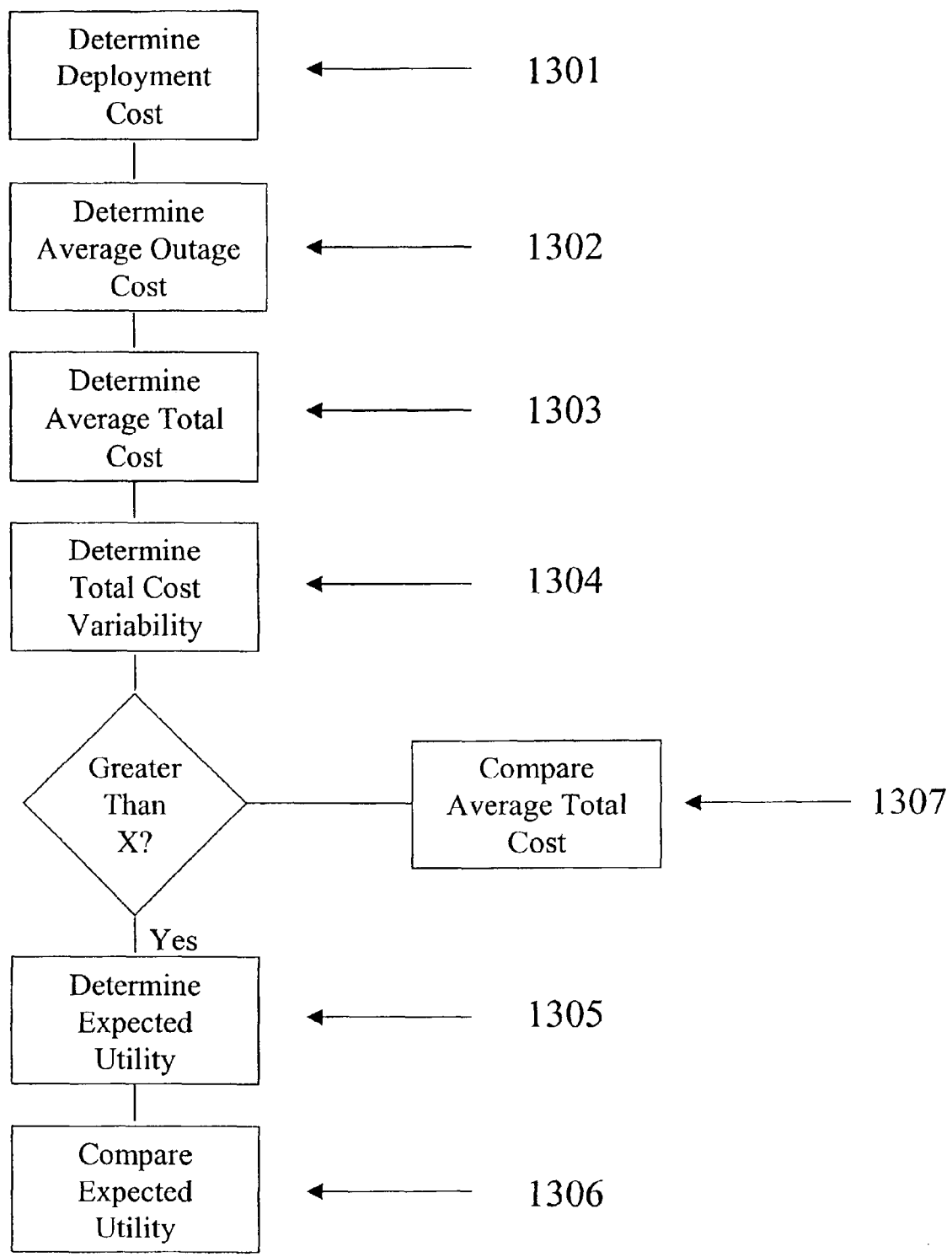
FIG. 13 depicts a method according to an embodiment of the present invention for analyzing risk.

Another preferred embodiment of the present invention is shown in FIG. 13. Similar to the embodiment shown in FIG. 12, in the first step in the embodiment shown in FIG. 13, step 1301, the deployment cost for each of a plurality of portfolios is determined. In the second step, step 1302, the average outage cost is determined. In the third step, step 1303, the average total cost is determined by summing deployment cost and average outage cost. Next, in step 1304, the total cost variability is determined. A procedure for determining the variability of total cost is described above. If the total cost variability is greater than some predetermined threshold value, then the preferred embodiment proceeds to step 1305, wherein the expected utility for at least two portfolios is determined. As described above, expected utility is determined responsive to total cost variability and an assumed utility function. Then, in step 1306, the determined expected utilities of the portfolios are compared. In general, it would be advisable for a decision maker to select the portfolio with the highest expected utility. If the total cost variability is not greater than the particular predetermined threshold value, the expected utility is not determined. Rather, the preferred embodiment proceeds to step 1307, wherein the average total cost of at least two of the portfolios is compared. In this circumstance, it would generally be advisable for a decision maker to select the portfolio with the lowest total cost. The predetermined threshold value for the total cost variability may be any appropriate value selected by one skilled in the art. In one embodiment, the predetermined threshold value may be 0.

In another preferred embodiment, the invention is carried out in a computer environment. Thus, for example, a computer program product may be provided comprising a computer usable medium having computer logic recorded thereon for instructing a computer to carry out the steps described, for example, with respect to either FIG. 1, 12 or 13.

Figure 14:
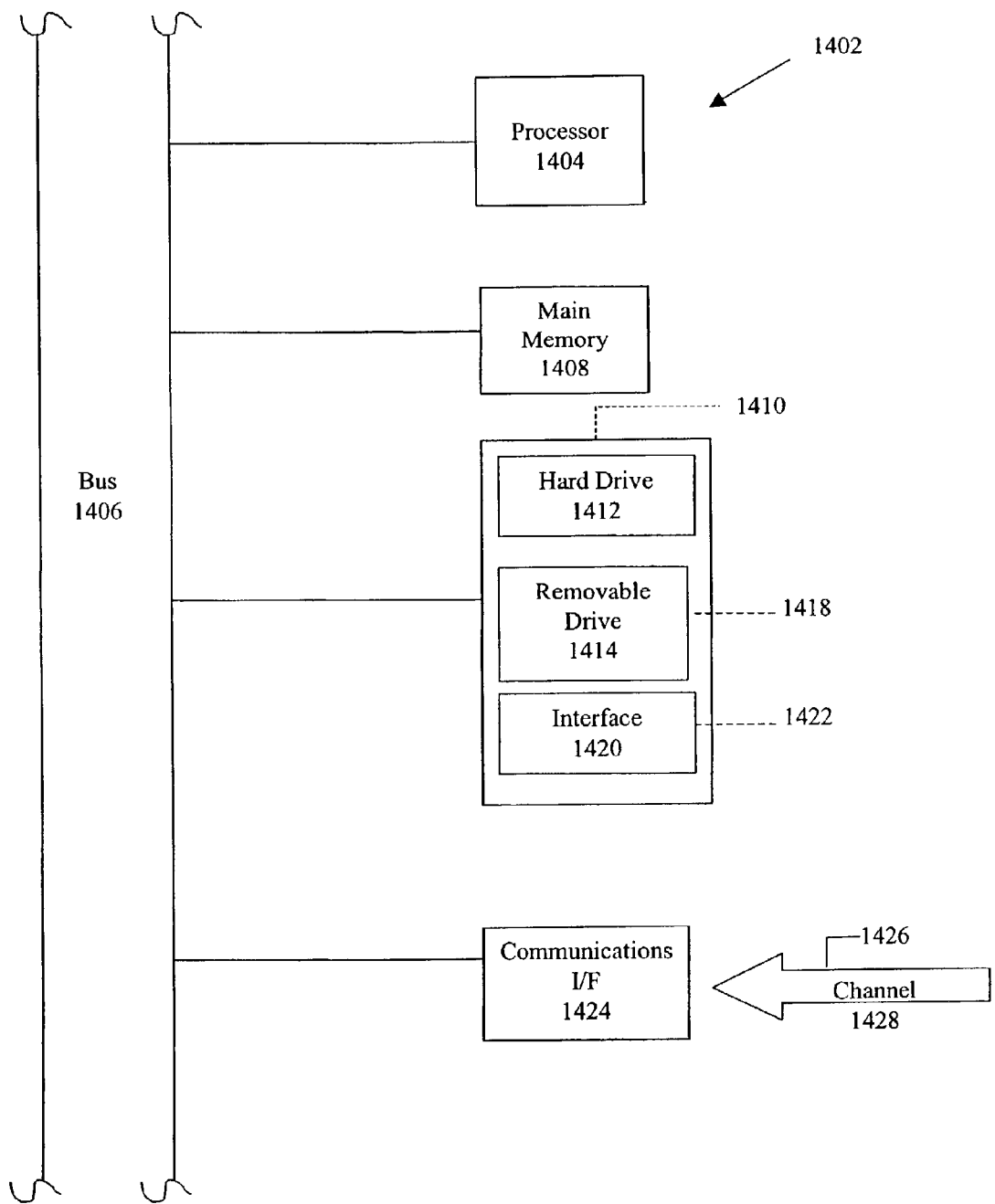
FIG. 14 depicts a block diagram of an example computer system.

FIG. 14 is a block diagram of a computer system as may be used to implement an embodiment of the invention.

With reference now to FIG. 14, a description of a computer system suitable for use with an embodiment of the present invention is provided. The computer system 1402 includes one or more processors, such as a processor 1404. The processor 1404 is connected to a communication bus 1406.

The computer system 1402 also includes a main memory 1408, preferably random access memory (RAM), and can also include a secondary memory 1410. The secondary memory 1410 can include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well-known manner. The removable storage unit 1418, represents a floppy disk, magnetic tape, optical disk, etc. which is read by and written to by the removable storage drive 1414. As will be appreciated, the removable storage unit 1418 includes a computer usable storage medium having stored therein computer software and/or data.

In alternative embodiments, the secondary memory 1410 may include other similar means for allowing computer programs or other instructions to be loaded into the computer system 1402. Such means can include, for example, a removable storage unit 1422 and an interface 1420. Examples of such can include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to the computer system 1402.

The computer system 1402 can also include a communications interface 1424. The communications interface 1424 allows software and data to be transferred between the computer system 1402 and external devices. Examples of the communications interface 1424 can include a modem, a network interface (such as an Ethernet card), a communications port, a PCMCIA slot and card, etc. Software and data transferred via the communications interface 1424 are in the form of signals 1426 that can be electronic, electromagnetic, optical or other signals capable of being received by the communications interface 1424. Signals 1426 are provided to communications interface via a channel 1428. A channel 1428 carries signals 1426 and can be implemented using wire or cable, fiber optics, a phone line, a cellular phone link, an RF link and other communications channels.

In this document, the term "computer-readable storage medium" is used to generally refer to media such as the removable storage device 1418, a hard disk installed in hard disk drive 1412, and signals 1426. These media are means for providing software and operating instructions to the computer system 1402.

Computer programs (also called computer control logic) are stored in the main memory 1408 and/or the secondary memory 1410. Computer programs can also be received via the communications interface 1424. Such computer programs, when executed, enable the computer system 1402 to perform the features of the present invention as discussed herein. In particular, the computer programs, when executed, enable the processor 1404 to perform the features of the present invention. Accordingly, such computer programs represent controllers of the computer system 1402.

In an embodiment where the invention is implemented using software, the software may be stored in a computer-readable storage medium and loaded into the computer system 1402 using the removable storage drive 1414, the hard drive 1412 or the communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

Although particular embodiments of the invention have been described and illustrated herein, it is recognized that modifications and variations may readily occur to those skilled in the art and consequently it is intended that the claims be interpreted to cover such modifications and equivalents.

The invention claimed is:

1. A processor-implemented method for analyzing risk comprising:
   determining, via a processor of a computing device, a deployment cost for each of a plurality of communication network element portfolios, wherein each communication network element portfolio comprises one or more communication network elements with a predetermined communication capacity;
   determining, via the processor, an outage cost for each of the plurality of communication network element portfolios responsive to the probability of one or more communication network element outages over a predetermined life cycle period;
   determining, via the processor, a total cost for each of the plurality of communication network element portfolios, wherein total cost is determined by summing the deployment cost and the outage cost for each of the plurality of communication network element portfolios, wherein the deployment cost and the outage cost are expressed in comparable units of measure; and
   comparing, via the processor, the total cost of a first communication network element portfolio of the plurality of communication network element portfolios with the total cost of a second communication network element portfolio of the plurality of communication network element portfolios, wherein the total cost is an indicator of the deployment cost and the risk.

2. The method of claim 1, wherein each communication network element of the first communication network element portfolio has a first predetermined communication capacity, and each communication network element of the second communication network element portfolio has a second predetermined communication capacity.

3. The method of claim 2, wherein the first predetermined communication capacity is different from the second predetermined communication capacity.

4. The method of claim 1, wherein each communication network element of the first communication network element portfolio has a substantially identical predetermined communication capacity.

5. The method of claim 4, wherein the number of communication network elements in the first communication network element portfolio is determined responsive to the substantially identical predetermined communication capacity and a total communication capacity of the first communication network element portfolio.

6. The method of claim 1, wherein the deployment cost for the first communication network element portfolio is determined responsive to the cost of obtaining each communication network element in the first communication network element portfolio and a recurring cost associated with maintaining each communication network element in the first communication network element portfolio over a predetermined time period.

7. The method of claim 1, wherein the outage cost for the first communication network element portfolio comprises a direct cost and an indirect cost associated with the one or more communication network element outages of the first communication network element portfolio.

8. The method of claim 7, wherein the direct cost comprises lost revenue associated with the one or more communication network element outages.

9. The method of claim 7, wherein the direct cost is determined responsive to the predetermined communication capacity of the one or more communication network elements in the first communication network element portfolio.

10. The method of claim 7, wherein the indirect cost is a predetermined function responsive to the predetermined communication capacity of the one or more communication network elements in the first communication network element portfolio.

11. The method of claim 10, wherein the predetermined function has the characteristic that a doubling of the predetermined communication capacity of the one or more communication network elements in the first communication network element portfolio more than doubles the indirect cost associated with at least one of the communication network element outages of the first communication network element portfolio.

12. The method of claim 1, wherein each of the plurality of communication network element portfolios comprises one or more telecommunications network elements.

13. The method of claim 12, further comprising:
repeating the step of determining the deployment cost if an additional telecommunications network element is added to a communication network portfolio, or the communication capacity of the one or more telecommunications network elements that comprise the communication network element portfolio is changed.

14. The method of claim 12, wherein the step of determining the deployment cost is carried out responsive to one or more of the group consisting of,
a cost of obtaining each telecommunications network element,
a cost of upgrading each telecommunications network element,
a cost of updating software, and
a port cost.

15. The method of claim 12, wherein the outage cost for at least one of the plurality of communication network element portfolios comprises lost revenue and ripple effect costs.

16. The method of claim 1, wherein each of the plurality of communication network element portfolios comprises a digital cross-connect.

17. A processor-implemented method for analyzing risk comprising:
determining, via a processor of a computing device, a deployment cost for each of a plurality of communication network element portfolios, wherein each communication network element portfolio comprises one or more communication network elements with a predetermined communication capacity;
determining, via the processor, an average outage cost for each of the plurality of communication network element portfolios responsive to the probability of communication network element failure;
determining, via the processor, an average total cost for each of the plurality of communication network element portfolios, wherein average total cost is determined by summing the deployment cost and the average outage cost for each of the plurality of communication network element portfolios and wherein the deployment cost and the average outage cost are expressed in comparable units of measure;
determining, via the processor, a total cost variability for each of the plurality of communication network element portfolios;
determining, via the processor, an expected utility for a first and a second of the plurality of communication network element portfolios, wherein the expected utility is determined responsive to the total cost variability and a utility function; and
comparing, via the processor, the expected utility of the first and second communication network element portfolios, wherein the expected utility is an indicator of the deployment cost and the risk.

18. The method of claim 17, wherein each of the plurality of communication network element portfolios comprises one or more telecommunications network elements.

19. The method of claim 18, further comprising:
repeating the step of determining the deployment cost if an additional telecommunications network element is added to a communication network portfolio, or the communication capacity of the one or more telecommunications network elements that comprise the communication network element portfolio is changed.

20. The method of claim 18, wherein the step of determining the deployment cost is carried out responsive to one or more of the group consisting of,
a cost of obtaining each telecommunications network element,
a cost of upgrading each telecommunications network element,
a cost of updating software, and
a port cost.

21. The method of claim 18, wherein the outage cost for at least one of the plurality of communication network element portfolios comprises lost revenue and ripple effect costs.

22. The method of claim 17, wherein each of the plurality of communication network element portfolios comprises a digital cross-connect.

23. The method of claim 17, wherein each of the plurality of communication network element portfolios has a substantially identical revenue.

24. The method of claim 23, wherein the utility function is responsive to a perceived value of the average total cost subtracted from the revenue.

25. The method of claim 23, wherein the utility function has the characteristic that a first derivative of the utility function is greater than or equal to zero and a second derivative of the utility function is less than or equal to zero.

26. The method of claim 23, wherein the utility function has the characteristic that it increases as the perceived value of the average total cost subtracted from the revenue increases and is concave.

27. A processor-implemented method for analyzing communication network elements comprising:
determining, via a processor of a computing device, a deployment cost for each of a plurality of communication network element portfolios, wherein each communication network element portfolio comprises one or more communication network elements with a predetermined communication capacity;
determining, via the processor, an average outage cost for each of the plurality of communication network element portfolios responsive to the probability of communication network element failure;
determining, via the processor, an average total cost for each of the plurality of communication network element portfolios, wherein average total cost is determined by summing the deployment cost and the average outage cost for each of the plurality of communication network element portfolios and wherein the deployment cost and the average outage cost are expressed in comparable units of measure;
determining, via the processor, a total cost variability for each of the plurality of communication network element portfolios;
determining, via the processor, an expected utility for a first and a second of the plurality of communication network element portfolios, wherein the expected utility is determined responsive to the total cost variability and a utility function; and
selecting, via the processor, one of the first and the second of the plurality of communication network element portfolios with a highest expected utility.

28. A system for analyzing communication network elements comprising:
means for determining a deployment cost for each of a plurality of communication network element portfolios, wherein each communication network element portfolio comprises one or more communication network elements with a predetermined communication capacity;

means for determining an average outage cost for each of the plurality of communication network element portfolios responsive to the probability of communication network element failure;

means for determining an average total cost for each of the plurality of communication network element portfolios, wherein average total cost is determined by summing the deployment cost and the average outage cost for each of the plurality of communication network element portfolios and wherein the deployment cost and the average outage cost are expressed in comparable units of measure;

means for determining a total cost variability for each of the plurality of communication network element portfolios;

means for determining an expected utility for a first and a second of the plurality of communication network element portfolios, wherein the expected utility is determined responsive to the total cost variability and a utility function; and means for selecting one of the first and the second of the plurality of communication network element portfolios with a highest expected utility.

29. The system of claim 28, wherein each of the plurality of communication network element portfolios comprises one or more telecommunications network elements.

30. The system of claim 29, wherein the means for determining the deployment cost re-determines deployment cost if an additional telecommunications network element is added to a communication network element portfolio, or the communication capacity of the one or more telecommunications network elements that comprise the communication network element portfolio is changed.

31. The system of claim 29, wherein the means for determining the deployment cost is responsive to one or more of the group consisting of,
   a cost of obtaining each telecommunications network element,
   a cost of upgrading each telecommunications network element,
   a cost of updating software, and
   a port cost.

32. The system of claim 29, wherein the outage cost for at least one of the plurality of communication network element portfolios comprises lost revenue and ripple effect costs.

33. The system of claim 28, wherein each of the plurality of communication network element portfolios comprises a digital cross-connect.

34. A computer program product comprising a non-transitory computer usable medium having computer program logic recorded thereon to be executed by a processor of a computing system to instruct the computer system to:

determine a deployment cost for each of a plurality of communication network element portfolios, wherein each communication network element portfolio comprises one or more communication network elements with a predetermined communication capacity;

determine an average outage cost for each of the plurality of communication network element portfolios responsive to the probability of communication network element failure;

determine an average total cost for each of the plurality of communication network element portfolios, wherein average total cost is determined by summing the deployment cost and the average outage cost for each of the plurality of communication network element portfolios and wherein the deployment cost and the average outage cost are expressed in comparable units of measure;

determine a total cost variability for each of the plurality of communication network element portfolios;

determine an expected utility for a first and a second of the plurality of communication network element portfolios, wherein the expected utility is determined responsive to the total cost variability and a utility function; and compare the expected utility of the first and second communication network element portfolios, wherein the expected utility is an indicator of the deployment cost and the risk.

35. A processor-implemented method for analyzing risk comprising:

determining, via a processor of a computing device, a deployment cost for each of a plurality of communication network element portfolios, wherein each communication network element portfolio comprises one or more communication network elements with a predetermined communication capacity;

determining, via the processor, an average outage cost for each of the plurality of communication network element portfolios responsive to the probability of communication network element failure;

determining, via the processor, an average total cost for each of the plurality of communication network element portfolios, wherein average total cost is determined by summing the deployment cost and the average outage cost for each of the plurality of communication network element portfolios and wherein the deployment cost and the average outage cost are expressed in comparable units of measure;

determining, via the processor, a total cost variability for each of the plurality of communication network element portfolios;

if the total cost variability is greater than a predetermined value, determining, via the processor, an expected utility for a first and a second of the plurality of communication network element portfolios, wherein the expected utility is determined responsive to the total cost variability and a utility function, and comparing the expected utility of the first and second communication network element portfolios, wherein the expected utility is an indicator of the deployment cost and the risk; and if the total cost variability is not greater than the predetermined value, comparing, via the processor, the average total cost for the first and second communication network element portfolios, wherein the average total cost is an indicator of the deployment cost and the risk.

36. The method of claim 35, wherein the predetermined value is 0.

* * * * *